US011922817B2

(12) United States Patent
Cai et al.

(10) Patent No.: US 11,922,817 B2
(45) Date of Patent: Mar. 5, 2024

(54) 4-DIMENSIONAL TRAJECTORY REGULATORY DECISION-MAKING METHOD FOR AIR TRAFFIC

(71) Applicant: BEIHANG UNIVERSITY, Beijing (CN)

(72) Inventors: Kaiquan Cai, Beijing (CN); Yanbo Zhu, Beijing (CN); Zhiqi Shen, Beijing (CN); Hui Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 331 days.

(21) Appl. No.: 17/491,327

(22) Filed: Sep. 30, 2021

(65) Prior Publication Data
US 2022/0122470 A1  Apr. 21, 2022

(30) Foreign Application Priority Data
Oct. 15, 2020 (CN) .......................... 202011104494.X

(51) Int. Cl.
  *G08G 5/00* (2006.01)
  *G06N 3/04* (2023.01)
  *G06N 5/022* (2023.01)
(52) U.S. Cl.
  CPC ............. *G08G 5/0017* (2013.01); *G06N 3/04* (2013.01); *G06N 5/022* (2013.01)
(58) Field of Classification Search
  CPC .. G08G 5/0017; G08G 5/0026; G08G 5/0034; G08G 5/0043; G08G 5/003; G06N 3/04; G06N 5/022; G06F 16/2465
  See application file for complete search history.

(56) References Cited

U.S. PATENT DOCUMENTS

2018/0285437 A1  10/2018  Boggio

FOREIGN PATENT DOCUMENTS

| CN | 107610531 A | 1/2018 |
| CN | 109460871 A | 3/2019 |
| CN | 109493644 A | 3/2019 |
| CN | 109816482 A | 5/2019 |
| CN | 111428015 A | 7/2020 |
| CN | 111613339 A | 9/2020 |

(Continued)

OTHER PUBLICATIONS

Notice of Allowance of the priority CN application No. 202011104494.X.

(Continued)

*Primary Examiner* — Michael V Kerrigan
(74) *Attorney, Agent, or Firm* — Maier & Maier, PLLC

(57) ABSTRACT

The present application provides a 4-dimensional trajectory regulatory decision-making method for air traffic. The method includes: acquiring a node vector set of a target flight to obtain a target node vector set; acquiring the node vector set of all historical flights simultaneously to obtain a historical node vector set; acquiring a similarity between the target node vector set and the node vector set of each historical flight in the historical node vector set to obtain a plurality of similarity data; acquiring a similarity data which is greater than a preset similarity data from plurality of similarity data to obtain a target similarity data; acquiring a historical flight to which the target similarity data belongs to obtain a target historical flight; acquiring a historical decision-making instruction of the target historical flight to obtain a target decision-making instruction.

10 Claims, 5 Drawing Sheets

ATC: Air traffic control
L: Location
CAC: Control area capacity
FN: Flight number
TN: Tail number
ARP: Air route point
DA: Departure airport
AA: Arrival airport
AN: Airport name
DepT: Departure time NDT: Number of departure flights
AC: Airport capacity
WI: Weather information
DelT: Delay time
FL: Flight level
SS: Spatial structure
L&L: Latitude and longitude
AT: Arrival time
NLF: Number of landing flights

(56) References Cited

FOREIGN PATENT DOCUMENTS

CN        111711614 A    9/2020
KR     20200085557 A    7/2020

OTHER PUBLICATIONS

NPL1: "A Visualization Analysis of Domestic Air Traffic Management Based on Mapping Knowledge Domains", Transport Information and Safety, vol. 6, No. 37, 2019.
NPL2: "Implementation and Typical Application of Big Date System for Spacecraft Test", Computer Measurement & Control, vol. 4, No. 27, pp. 254-262, Apr. 25, 2019.
NPL3-PART1: "Data intelligence: Trends and challenges", Systems Engineering-Theory & Practice, vol. 8, No. 40, pp. 2117-2124, Aug. 3, 2020.
NPL3-PART2: "Data intelligence: Trends and challenges", Systems Engineering-Theory & Practice, vol. 8, No. 40, pp. 2125-2149, Aug. 3, 2020.
The first Office Action of the priority CN application No. 202011104494.X.
NPL1: "Research and Application of Recommendation Technology Based on Knowledge", by Yiming Wang, a Master Thesis submitted to University of Electronic Science and Technology of China, Oct. 15, 2018.
NPL2: "A hybrid recommendation algorithm based on heuristic similarity and trust measure", 2018 17th IEEE International Conference on Trust, Security and Privacy in Computing and Communications/12th IEEE International Conference on Big Data Science and Engineering, pp. 1413-1418.

Acquire a node vector set of a target flight to obtain a target node vector set; where the target node vector set is determined according to a real-time knowledge graph, and the real-time knowledge graph is used to represent a relationship between flight information, air route information and air traffic control unit information related to an aircraft corresponding to the target flight during flight — S201

Acquire the node vector set of all historical flights simultaneously to obtain a historical node vector set; where the historical node vector set is determined according to a historical knowledge graph, and the historical knowledge graph is used to represent a relationship between historical flight information, historical air route information and historical air traffic control unit information related to aircraft corresponding to the historical flights during flight — S202

Acquire a similarity between the target node vector set and the node vector set of each historical flight in the historical node vector set to obtain a plurality of similarity data — S203

Acquire a similarity data which is greater than a preset data, from the plurality of similarity data to obtain a target similarity data — S204

Acquire a historical flight to which the target similarity data belongs to obtain a target historical flight — S205

Acquire a historical decision-making instruction of the target historical flight to obtain a target decision-making instruction, where the target decision-making instruction is used to assist in regulatory decision-making for the target flight — S206

FIG. 2

Acquire a real-time structured data of the real-time knowledge graph of the target flight — S301

Input the real-time structured data into a heterogeneous skip-gram neural network model to obtain the target node vector set — S302

FIG. 3

```
┌─────────────────────────────────────────────────────────────┐
│ Acquire a historical structured data of the historical      │ ─ S401
│ knowledge graph of the historical flight simultaneously     │
└─────────────────────────────────────────────────────────────┘
                              ▼
┌─────────────────────────────────────────────────────────────┐
│ Input the historical structured data into the heterogeneous │
│ skip-gram neural network model to obtain the node vector    │ ─ S402
│ set of all the historical flights                           │
└─────────────────────────────────────────────────────────────┘
```

FIG. 4

```
┌─────────────────────────────────────────────────────────────┐
│ Construct a corpus of the heterogeneous skip-gram neural    │ ─ S501
│ network model according to the real-time knowledge graph    │
│ to obtain a first corpus                                    │
└─────────────────────────────────────────────────────────────┘
                              ▼
┌─────────────────────────────────────────────────────────────┐
│ Input the first corpus into the heterogeneous skip-gram     │ ─ S502
│ neural network model to obtain the target node vector set   │
└─────────────────────────────────────────────────────────────┘
```

FIG. 5

```
┌─────────────────────────────────────────────────────────────┐
│ Take any node in the real-time knowledge graph as a         │ ─ S601
│ starting point to perform path wandering                    │
└─────────────────────────────────────────────────────────────┘
                              ▼
┌─────────────────────────────────────────────────────────────┐
│ Acquire a result of the path wandering of the real-time     │ ─ S602
│ knowledge graph to obtain the first corpus                  │
└─────────────────────────────────────────────────────────────┘
```

FIG. 6

```
┌─────────────────────────────────────────────────────────────┐
│ Construct a second corpus of the heterogeneous skip-gram    │ ─ S701
│ neural network model according to the historical knowledge  │
│ graph simultaneously                                        │
└─────────────────────────────────────────────────────────────┘
                              ▼
┌─────────────────────────────────────────────────────────────┐
│ Input the second corpus to the heterogeneous skip-gram      │ ─ S702
│ neural network model to obtain the historical node vector   │
│ set                                                         │
└─────────────────────────────────────────────────────────────┘
```

FIG. 7

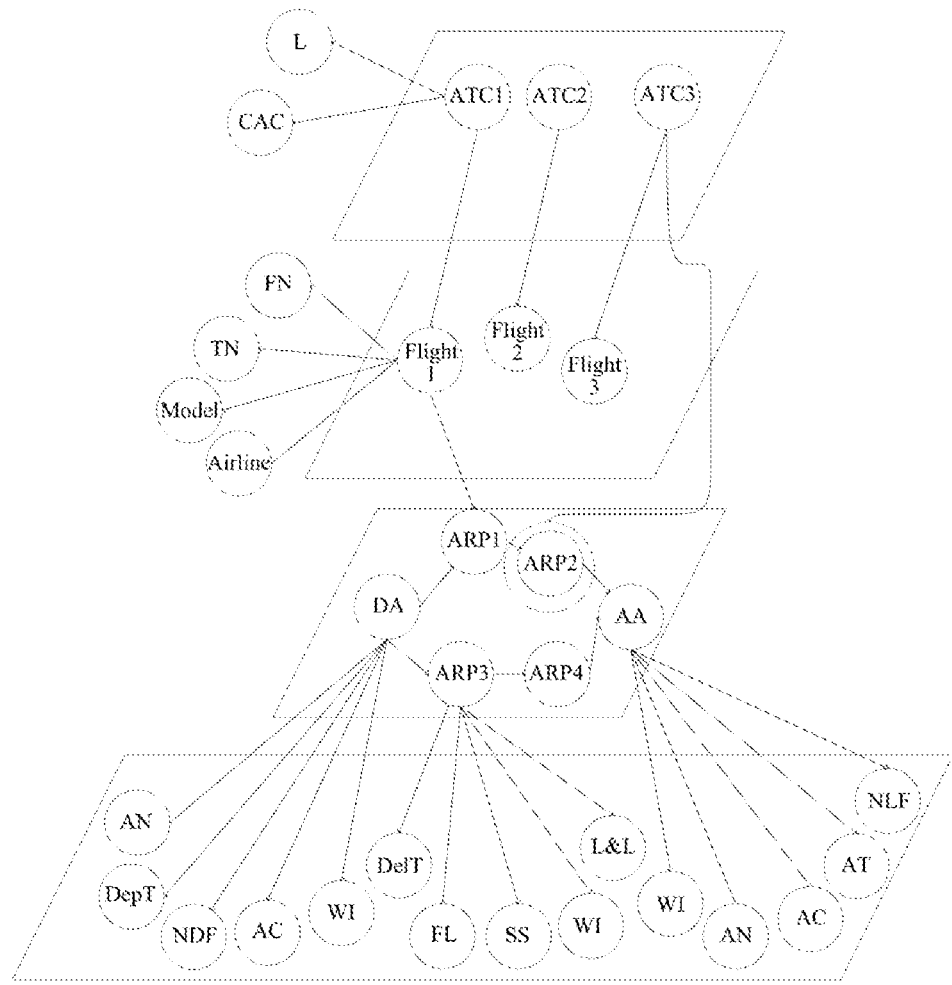

ATC: Air traffic control
L: Location
CAC: Control area capacity
FN: Flight number
TN: Tail number
ARP: Air route point
DA: Departure airport
AA: Arrival airport
AN: Airport name
DepT: Departure time NDT: Number of departure flights
AC: Airport capacity
WI: Weather information
DelT: Delay time
FL: Flight level
SS: Spatial structure
L&L: Latitude and longitude
AT: Arrival time
NLF: Number of landing flights

FIG. 8

4-DIMENSIONAL TRAJECTORY REGULATORY DECISION-MAKING METHOD FOR AIR TRAFFIC

CROSS-REFERENCE TO RELATED APPLICATIONS

This application claims priority to Chinese Patent Application No. 202011104494.X, filed on Oct. 15, 2020, which is hereby incorporated by reference in its entirety.

TECHNICAL FIELD

The present application relates to the technology of 4-dimensional trajectory based operation and management, and in particular, to a 4-dimensional trajectory regulatory decision-making method for air traffic.

BACKGROUND

Air traffic control system is a system that is used to manage the take-off and landing and navigation of multiple aircraft to ensure flight order and safety. With the development of the air transportation industry, the support capability of the existing air traffic control system is gradually unable to meet the ever-increasing flight demand, and as such the problems such as air traffic congestion and large-scale flight delays frequently appear. In order to solve the problem that the support capability of the existing air traffic control system cannot meet the current flight requirements, the International Civil Aviation Organization proposes to evolve and upgrade the existing air traffic control system globally towards 4-dimensional trajectory-based operation (short as TBO) by 2035, that is, to build an air traffic system oriented to 4-dimensional trajectory based operation, where the air traffic system includes aircraft information, flight information, air traffic control unit information, and trajectory information. This air traffic system is a complex system which is highly correlated, highly dynamic, and tightly coupled between structure and communication. The 4-dimensional trajectory refers to the traditional three-dimensional space, namely longitude, latitude and altitude, plus a fourth dimension, namely time, based on which an aircraft's trajectory is determined, and flight parameters, such as the aircraft's weight, altitude, speed, are taken into account to obtain real-time, accurate and continuous 4-dimensional trajectory information.

Then, when performing flight regulation of some certain aircraft in the air traffic system with 4-dimensional trajectory based operation, an air traffic controller with great experiences is needed to conduct controls based on the real-time operating information of the aircraft. This control method relies on the work experience of air traffic controllers and has great risks.

Therefore, how to make control decisions for the aircraft's 4-dimensional trajectory based operation is still a problem that needs to be resolved.

SUMMARY

The present application provides a 4-dimensional trajectory regulatory decision-making method for air traffic, which is used to solve the problem of how to make a regulatory decision for the 4-dimensional trajectory based operation of an aircraft.

The present application provides a 4-dimensional trajectory regulatory decision-making method for air traffic, including:
acquiring a node vector set of a target flight to obtain a target node vector set; where the target node vector set is determined according to a real-time knowledge graph, and the real-time knowledge graph is used to represent a relationship between flight information, air route information and air traffic control unit information related to an aircraft corresponding to the target flight during flight;
acquiring the node vector set of all historical flights simultaneously to obtain a historical node vector set; where the historical node vector set is determined according to a historical knowledge graph, and the historical knowledge graph is used to represent a relationship between historical flight information, historical air route information and historical air traffic control unit information related to aircraft corresponding to the historical flights during flight;
acquiring a similarity between the target node vector set and the node vector set of each historical flight in the historical node vector set to obtain a plurality of similarity data;
acquiring a similarity data which is greater than a preset data, from the plurality of similarity data to obtain a target similarity data;
acquiring a historical flight to which the target similarity data belongs to obtain a target historical flight; and
acquiring a historical decision-making instruction of the target historical flight to obtain a target decision-making instruction, where the target decision-making instruction is used to assist in regulatory decision-making for the target flight.

In an embodiment, the acquiring the node vector set of the target flight to obtain the target node vector set includes:
acquiring a real-time structured data of the real-time knowledge graph of the target flight;
inputting the real-time structured data into a heterogeneous skip-gram neural network model to obtain the target node vector set.

In an embodiment, the acquiring the node vector set of all the historical flights simultaneously to obtain the historical node vector set includes:
acquiring a historical structured data of the historical knowledge graph of the historical flights simultaneously;
inputting the historical structured data into the heterogeneous skip-gram neural network model to obtain the node vector set of all the historical flights;
where the real-time structured data and the historical structured data are inputted into the heterogeneous skip-gram neural network model simultaneously.

In an embodiment, the inputting the real-time structured data into the heterogeneous skip-gram neural network model to obtain the target node vector set includes:
constructing a corpus of the heterogeneous skip-gram neural network model according to the real-time knowledge graph to obtain a first corpus;
inputting the first corpus into the heterogeneous skip-gram neural network model to obtain the target node vector set.

In an embodiment, the inputting the historical structured data into the heterogeneous skip-gram neural network model to obtain the node vector set of all the historical flights includes:

constructing a second corpus of the heterogeneous skip-gram neural network model according to the historical knowledge graph simultaneously;

inputting the second corpus to the heterogeneous skip-gram neural network model to obtain the historical node vector set;

where the first corpus and the second corpus are inputted into the heterogeneous skip-gram neural network model simultaneously.

In an embodiment, the first corpus is a path set of the real-time knowledge graph, and the constructing the corpus of the heterogeneous skip-gram neural network model according to the real-time knowledge graph to obtain the first corpus includes:

taking any node in the real-time knowledge graph as a starting point to perform path wandering;

acquiring a result of the path wandering of the real-time knowledge graph to obtain the first corpus.

In an embodiment, the second corpus is a path set of the historical knowledge graph, and the constructing the second corpus of the heterogeneous skip-gram neural network model according to the historical knowledge graph includes:

taking any node in the historical knowledge graph as a starting point to perform path wandering simultaneously;

acquiring a result of the path wandering of the historical knowledge graph to obtain the second corpus.

In an embodiment, the method further includes:

constructing the real-time knowledge graph according to the real-time structured data of the real-time knowledge graph, where the real-time knowledge graph includes a plurality of nodes and sides connecting any two nodes; each of the nodes represents each piece of flight information, each piece of air route information, and each piece of air traffic control unit information related to the aircraft corresponding to the target flight during flight, and the sides are used to represent the relationship between the flight information, the air route information and the air traffic control unit information.

In an embodiment, the similarity is cosine similarity, and the acquiring the similarity between the target node vector set and the node vector set of each historical flight in the historical node vector set to obtain the plurality of similarity data includes;

determining the similarity data based on the equation $$s(a, b) = \cos\theta = \frac{X_a \cdot X_b}{|X_a| \cdot |X_b|},$$

where $X_a$ represents the target node vector set; $X_b$ represents the historical node vector set.

In an embodiment, after obtaining the target decision-making instruction, the method further includes:

acquiring a decision-making retrieving instruction;

retrieving the target decision-making instruction according to the decision-making retrieving instruction.

The present application provides a 4-dimensional trajectory regulatory decision-making method for air traffic, where a complex air traffic system is converted into a graph data structure by constructing a knowledge graph, the node vector set is obtained by processing the graph data structure, and then a historical scene similar to the operating scene of the target flight is determined by matching the node vector sets. After determining the similar historical scene, the decision-making instruction for the similar historical scene is acquired and taken as the decision-making instruction for the operating scene of the target flight. At this time, the air traffic controller can learn how to regulate the current flight operation scene by the decision-making instruction of the similar historical scene, without relying on the air traffic controller's work experience, which reduces the probability of failure in flight regulation of some certain aircraft or flights in the air traffic control system orientated to 4-dimensional trajectory based operation and ensures the safety of aviation operations.

BRIEF DESCRIPTION OF DRAWINGS

The accompanying drawings here are incorporated into the specification and constitute a part of the specification, which show embodiments in accordance with the present application, and are used to explain the principle of the present application with the specification.

FIG. 2 is a schematic flowchart of a 4-dimensional trajectory regulatory decision-making method for air traffic provided by an embodiment of the present application;

FIG. 3 is a schematic flowchart of a 4-dimensional trajectory regulatory decision-making method for air traffic provided by another embodiment of the present application;

FIG. 4 is a schematic flowchart of a 4-dimensional trajectory regulatory decision-making method for air traffic provided by still another embodiment of the present application;

FIG. 5 is a schematic flowchart of a 4-dimensional trajectory regulatory decision-making method for air traffic provided by yet another embodiment of the present application;

FIG. 6 is a schematic real-time knowledge graph of a 4-dimensional trajectory regulatory decision-making method for air traffic provided by an embodiment of the present application;

FIG. 7 is a schematic flowchart of a 4-dimensional trajectory regulatory decision-making method for air traffic provided by still another embodiment of the present application;

FIG. 8 is a schematic real-time knowledge graph provided by an embodiment of the present application;

Through the above drawings, the specific embodiments of the present application have been shown, which will be described in details below. These drawings and text descriptions are not intended to limit the scope of the conception of the present application in any way, but to explain the concept of the present application to the skilled in the art by referring to specific embodiments.

DESCRIPTION OF EMBODIMENTS

The illustrative embodiments will be described in detail here, and examples thereof are shown in the accompanying drawings. When the following description refers to the drawings, unless otherwise indicated, the same numbers in different drawings indicate the same or similar elements. The implementation manners described in the following illustrative embodiments do not represent all implementation manners consistent with the present application. On the contrary, they are merely examples of devices and methods consistent with some aspects of the present application as detailed in the appended claims.

First, the terms involved in the present application are explained:

Knowledge Graph: also known as scientific knowledge graph, is a concept in the field of library and information science, which is used to map, analyze and display the interrelationships between disciplines or academic research subjects and which is a visualization tool that reveals the development process and structural relationship of scientific knowledge.

Figure 1:
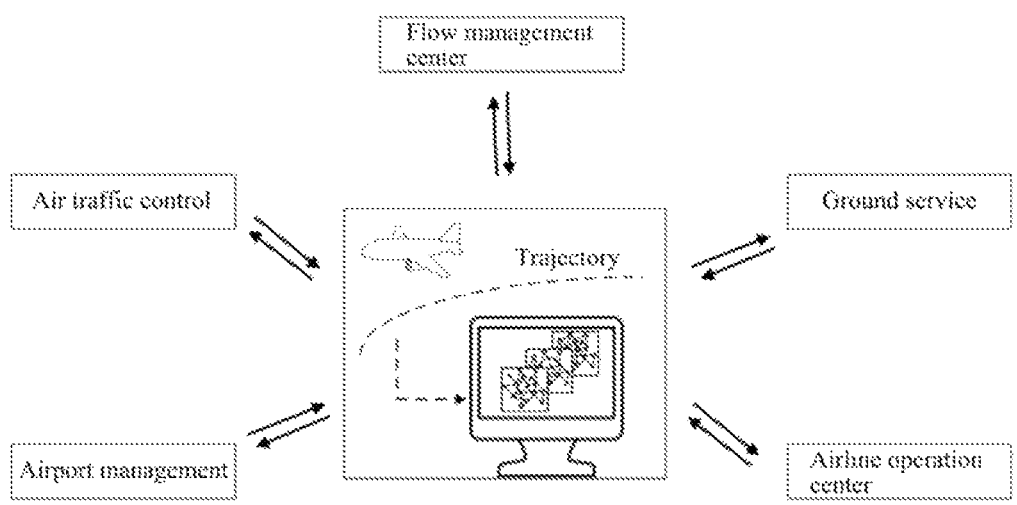
FIG. 1 is an application scenario diagram of a 4-dimensional trajectory regulatory decision-making method for air traffic provided by the present application.

The 4-dimensional trajectory regulatory decision-making method for air traffic provided in the present application is applied to a computer device, such as a computer, a server, a tablet computer, a mobile phone, and so on. FIG. 1 is an application diagram of a 4-dimensional trajectory regulatory decision-making method for air traffic provided by the present application. In the figure, the computer device receives aircraft operation information, which includes aircraft serial number information, aircraft trajectory information, information of respective involved parties, etc., and then builds a knowledge map based on the aircraft operation information. The information of respective involved parties comes from the involved parties, and the involved parties include, for example, a flow management center, an air traffic control, a ground service, an airport management, and an airline operation center.

Air traffic control system is a system that is used to manage the take-off and landing and navigation of multiple aircraft to ensure flight order and safety. With the development of the air transportation industry, the support capability of the existing air traffic control system is gradually unable to meet the ever-increasing flight demand, and as such the problems such as air traffic congestion and large-scale flight delays frequently appear. In order to solve the problem that the existing air traffic control system support capability cannot meet the current flight requirements, the International Civil Aviation Organization proposes to evolve and upgrade the existing air traffic control system globally towards the 4-dimensional trajectory based operation (short as TBO) by 2035, that is, to build an air traffic system oriented to 4-dimensional trajectory operation, where the air traffic system includes aircraft information, flight information, air traffic control unit information, and trajectory information. This air traffic system is a complex system which is highly correlated, highly dynamic, and tightly coupled between structure and communication. The 4-dimensional trajectory refers to the traditional three-dimensional space, namely longitude, latitude and altitude, plus a fourth dimension, namely time, based on which an aircraft's trajectory is determined, and flight parameters, such as weight, altitude, speed, are taken into account to obtain real-time, accurate and continuous 4-dimensional trajectory information. By establishing an air traffic system oriented to a 4-dimensional trajectory, the purpose of monitoring, predicting and controlling aircraft flight in four dimensions can be achieved. In the prior art, when performing flight regulation of some certain aircraft in the air traffic system with 4-dimensional trajectory based operation, an air traffic controller with great experiences is needed to conduct controls based on the real-time operating information of the aircraft. However, when encountering large-scale 4-dimensional trajectory control, or encountering unexpected situations caused by bad weather, the air traffic controller may not be able to perform real-time and accurate control. Therefore, in the prior art, flight regulation performed in an air traffic system with 4-dimensional trajectory based operation mainly relies on the work experience of the air traffic controller and has a great control risk. Therefore, how to make trajectory regulation decisions for the 4-dimensional trajectory based operation of an aircraft is still a problem that needs to be resolved.

Based on this, the present application provides a 4-dimensional trajectory regulatory decision-making method for air traffic, where a complex air traffic system with 4-dimensional trajectory based operation is converted into a graph data structure through an air traffic control knowledge graph, a historical decision-making instruction is obtained by processing the graph data structure and taken as the current regulatory decision, so as to assist the air traffic controller to conduct aviation flight regulation according to the acquired historical decision-making instruction. Specifically, the method provided in the present application simultaneously converts the information of the air traffic system to which the current target flight belongs and the information of the air traffic system to which the historical flight belongs into the real-time graph data structure and the historical graph data structure, respectively, and obtains the historical scene that is similar to the target flight through comparing the two graph data structures. Then, the decision-making instruction of the similar historical scene is acquired as the decision-making instruction of the current target flight. At this time, the real-time, accurate, and efficient regulation of the target flight or target aircraft can be realized without relying on the work experience of the air traffic controller, which solves the problem of high risk in the prior art when making regulatory decisions for the 4-dimensional trajectory based operation of the aircraft.

The technical solutions of the present application and how the technical solutions of the present application solve the above technical problems will be described in detail below with specific embodiments. The following specific embodiments may be combined with each other, and the same or similar concepts or processes may not be repeated in some embodiments. The embodiments of the present application will be described below in conjunction with the accompanying drawings.

Referring to FIG. 2, the present application provides a 4-dimensional trajectory regulatory decision-making method for air traffic, including:

S201: acquire a node vector set of a target flight to obtain a target node vector set; where the target node vector set is determined according to a real-time knowledge graph, and the real-time knowledge graph is used to represent a relationship between flight information, air route information and air traffic control unit information related to an aircraft corresponding to the target flight during flight.

The real-time knowledge graph is used to represent flight information, air route information and air traffic control unit information related to an aircraft corresponding to the target flight during flight, and a relationship between the flight information, the air route information and the air traffic control unit information. Specifically, the real-time knowledge graph takes the information of the flight in the stage of 4-dimensional trajectory based operation as the core, and is constructed by using the air traffic control unit information and the air route information as the main framework, where the air traffic control unit includes the airspace management department, the air traffic flow management unit, the air traffic control unit, the airport operation units and so on. That is, when constructing the real-time knowledge graph, the flight which is in the stage of 4-dimensional trajectory based operation is determined first. For example, it is determined first that flight 1 is in the stage of 4-dimensional trajectory based operation, and the flight 1 is used to determine that the air traffic control unit information associated with flight 1 is air traffic control department 1, and the air route information associated with flight 1 is: air route point 1→air route point 2→arrival airport. If there is no other information related to flight 1, the real time knowledge graph is constructed by using the flight 1 as the core at this time. After the flight 1 is constructed, the air traffic control unit information of the flight 1 and the air route information of the flight 1 are constructed, and the association relationship between the air traffic control unit information of the flight 1 and the flight 1 (i.e. the side) is established, and the association relationship between the air route information of the flight 1 and the flight 1 (i.e. the side) is established. At this time, the flight 1, the air traffic control department 1, the air route point 1, the air route point 2, and the arrival airport are all nodes in the real-time knowledge graph, and the sides in the real-time knowledge graph are used to represent the association relationships between the flight 1, the air traffic control department 1, the air route point 1, the air route point 2, and the arrival airport.

The real-time knowledge graph may express complex business facts and business relationships in the process of trajectory regulation during the stage of 4-dimensional trajectory based operation. In the real-time knowledge graph, the flight, the airspace management department, the air traffic flow management unit, the air traffic control unit, the airport operation unit and other control units, as well as the air route of the aircraft included in the flight, are the nodes of the real-time knowledge graph. The sides of the knowledge graph are used to represent the relationship between the flight, the airspace management department, the air traffic flow management unit, the air traffic control unit, the airport operation unit and other control units and the air route of the aircraft included in the flight. The sides of the real-time knowledge graph will change as the relationship changes. For example, if the air route point of the target flight is transferred from the current air route point to the next air route point, the side used to connect the target flight node and the current air route point node is deleted, and a side that connects the target flight node and the next air route point node is established.

Illustratively, the real-time knowledge graph may be defined as $G=(V,E,T)$ ($\phi:V \rightarrow T_V$, $\psi:E \rightarrow T_E$), where V represents a set of multiple types of nodes, and E represents a set of multiple types of sides, T represents a set of object types, and the object types refer to nodes and sides. For example, different types of nodes include flight, control unit, air route, weather condition, and so on. Different types of sides are for example regulatory relations, environmental relations, etc. ($\phi:V \rightarrow T_V$) represents the relationship between each node and the set of node types, ($\psi:E \rightarrow T_E$) represents the relationship between each side and the set of side types.

The node vector set refers to a set of vector representations of all nodes in the real-time knowledge graph. The node vector set covers the nodes in the real-time knowledge graph and the semantic information between different nodes. Due to the real-time changes of the real-time knowledge graph caused by the real-time dynamic changes of the target flight, the node vector set also changes dynamically. Therefore, when describing the node vector set, it is generally described as a set of node vectors at a certain moment. The real-time change of the real-time knowledge graph caused by the real-time dynamic change of the target flight means that the type and number of nodes in the real-time knowledge graph may increase according to the nodes involved in the operation of the target flight, and the originally existing nodes will not be removed, and the real-time knowledge graph is continuously expanded with the operation of the target flight.

S202: acquire the node vector set of all historical flights simultaneously to obtain a historical node vector set; where the historical node vector set is determined according to a historical knowledge graph, and the historical knowledge graph is used to represent a relationship between historical flight information, historical air route information and historical air traffic control unit information related to aircraft corresponding to the historical flights during flight.

The historical flight refers to all flights before the target flight or flights before the target flight within a certain specific period of time, for example, the flights within one year or six months before the current flight. The historical knowledge graph is a knowledge graph constructed based on the relationship between the flight information, the air route information, and the air traffic control unit information related to each flight of the historical flights. The historical node vector set refers to the set of vector representations of all nodes in the historical knowledge graph. The node vector set covers the nodes in the historical knowledge graph and the semantic information between different nodes. The historical knowledge graph also continuously expands with the increase of historical flights.

S203: acquire a similarity between the target node vector set and the node vector set of each historical flight in the historical node vector set to obtain a plurality of similarity data.

There may be many kinds of algorithms for similarity between vector sets. Common similarity algorithms include Pearson correlation coefficient, Euclidean distance, cosine similarity, Manhattan distance algorithm and so on. When calculating the similarity between the node vector sets, it is necessary to calculate the similarity between each type of node vector of the target flight and the corresponding node vector of the historical flight. The each type of node vector is, for example, the flight, the control unit, the air route, the weather condition, etc. For example, by comparing the similarity between the node vector of the target flight whose node type is flight and the node vector of all historical flights whose node type is flight, a plurality of similarity data may be obtained.

S204: acquire a similarity data which is greater than a preset data, from the plurality of similarity data to obtain a target similarity data.

The preset data may be set according to actual needs, which is not limited in the present application. The target similarity data may be one piece of data or multiple pieces of data.

S205: acquire a historical flight to which the target similarity data belongs to obtain a target historical flight.

After obtaining the target similarity data, it is needed to acquire the node vector set corresponding to the target similarity data first, and then determine the historical flight to which it belongs according to the node vector set to obtain the target historical flight. The scene which the target historical flight is in is the scene of which the similarity with the target flight reaches a preset similarity.

S206: acquire a historical decision-making instruction of the target historical flight to obtain a target decision-making instruction, where the target decision-making instruction is used to assist in regulatory decision-making for the target flight.

The scene which the target historical flight is in is similar to the scene where the target flight is in. Therefore, the target decision-making instruction of the scene where the target historical flight is in is acquired, which may be used to assist in the regulatory decision-making of the target flight. Air traffic controllers may regulate the target flight according to the target decision-making instruction.

The present application provides a 4-dimensional trajectory regulatory decision-making method for air traffic, where a complex air traffic system is converted into a graph data structure by constructing a knowledge graph, the node vector set is obtained by processing the graph data structure, and then a historical scene similar to the operating scene of the target flight is determined by matching the node vector sets. After determining the similar historical scene, the decision-making instruction for the similar historical scene is acquired and taken as the decision-making instruction for the operation scene of the target flight. At this time, the air traffic controller can learn how to regulate the current flight operation scene by the decision-making instruction of the similar historical scene, without relying on the air traffic controller's work experience, which reduces the probability of failure in flight regulation of some certain aircraft or flights in the air traffic control system oriented to 4-dimensional trajectory based operation and ensures the safety of aviation operations.

Referring to FIG. 3, in an embodiment of the present application, step S201 includes:

S301: acquire a real-time structured data of the real-time knowledge graph of the target flight.

The real-time structured data of the real-time knowledge graph refers to respective nodes and respective sides of the real-time knowledge graph in real time. Because the real-time knowledge graph will continue to expand and change with the operation of the target flight, the real-time structured data of the real-time knowledge graph refers to the real-time nodes and real-time sides of the real-time knowledge graph. The real-time nodes may be the nodes of which the number increases, and the real-time sides may refer to the sides that increase and change as the number of nodes increases.

S302: input the real-time structured data into a heterogeneous skip-gram neural network model to obtain the target node vector set.

The real-time structured data here refers to the graph data of the real-time knowledge graph. The node vector set of the real-time knowledge graph, which is the target node vector set, may be obtained by inputting the graph data of the real-time knowledge graph into the heterogeneous skip-gram neural network model.

Referring to FIG. 4, in an embodiment of the present application, step S202 includes:

S401: acquire a historical structured data of the historical knowledge graph of the historical flight simultaneously.

The historical structured data of the historical knowledge graph refers to respective nodes and respective sides of the historical knowledge graph in real time at historical moments. As the number of historical flights increases, the historical knowledge graph may expand and change continuously. The historical structured data refers to the real-time nodes and real-time sides of the historical knowledge graph at historical moments. The real-time nodes may be the node of which the number increases, and the real-time sides may refer to the sides that increases and changes as the number of nodes increases.

S402: input the historical structured data into the heterogeneous skip-gram neural network model to obtain the node vector set of all the historical flights.

The historical structured data here refers to the graph data of the historical knowledge graph. The node vector set of the historical knowledge graph, which is the historical node vector set, may be obtained by inputting the graph data of the historical knowledge graph into the heterogeneous word-skipping neural network model.

It should be noted that the real-time knowledge graph and the historical knowledge graph need to be acquired simultaneously, but are not acquired sequentially or separately. The real-time structured data and the historical structured data are inputted to the heterogeneous word-skipping neural network model simultaneously. That is, step S301 and step S401 are executed at the same time, and step S302 and step S402 are executed at the same time.

Referring to FIG. 5, in an embodiment of the present application, step S302 includes:

S501: construct a corpus of the heterogeneous skip-gram neural network model according to the real-time knowledge graph to obtain a first corpus.

The first corpus is used to construct the heterogeneous skip-gram neural network model.

Referring to FIG. 6, in an embodiment of the present application, the first corpus is a path set of the real-time knowledge graph, and step S501 includes:

S601: take any node in the real-time knowledge graph as a starting point to perform path wandering.

Specifically, from the real-time knowledge graph G=(V, E, T)(ϕ: V→$T_V$, ψ: E→$T_E$), the initial meta-path is defined in the form $$\text{Path} = V_1 \xrightarrow{R_1} V_2 \xrightarrow{R_2} \ldots V_t \xrightarrow{R_t} V_{t+1} \ldots \xrightarrow{R_{l-1}} V_l,$$

where $V_1, V_2 \ldots V_t, V_{t+1}, V_l$ represents different node types, and Path represents a path combination between $V_1$ and $V_l$, such as "control department→flight→air route point". The random wandering is under the guidance of the meta-path, and during the wandering, the specific transition probability of each step is shown in formula (1):

$$p(v^{i+1} \mid v_t^i, \text{Path}) = \begin{cases} \dfrac{1}{|N_{t+1}(v_t^i)|}, & (v^{i+1}, v_t^i) \in E, \phi(v^{i+1}) = V_{t+1} \\ 0, & (v^{i+1}, v_t^i) \in E, \phi(v^{i+1}) \neq V_{t+1} \\ 0, & (v^{i+1}, v_t^i) \notin E \end{cases} \quad (1)$$

where, $v_t^i \in V_t$ represents the node of the type $V_t$ of the ith step of the wandering along the meta-path Path, and $N_{t+1}(v_t^i)$ represents the set of nodes of the type $V_{t+1}$ in the neighbor nodes of the node $v_t^i$, and the neighbor node refers to the node adjacent to the current node $v_t^i$. $\phi(v^{i+1})$ indicates the type of node in the (i+1)th step. Equation (1) shows that when random wandering at the i-step, if the next node is connected to the current node and the type of the next node is $V_{t+1}$, the probability of wandering is $$\dfrac{1}{|N_{t+1}(v_t^i)|},$$

an otherwise the probability of wandering is 0.

S602: acquire a result of the path wandering of the real-time knowledge graph to obtain the first corpus.

Through the random wandering guided by the meta-path, several path sets can be obtained from the real-time knowledge graph constructed in step S201, and the several path sets are the first corpus required by the heterogeneous word-skipping neural network.

S502: input the first corpus into the heterogeneous skip-gram neural network model to obtain the target node vector set.

After the first corpus is input into the heterogeneous skip word neural network model, the heterogeneous skip-gram neural network model outputs the node vector set of the target flight after learning, i.e. the target node vector set. However, it should be noted that the real-time knowledge graph and the historical knowledge graph jointly constitute the air traffic control knowledge graph, and the corpus of the heterogeneous skip-gram neural network model is determined according to the air traffic control knowledge graph. Therefore, the first corpus is not singly inputted into the heterogeneous skipping word neural network model, but it needs to be combined with the corpus corresponding to the historical knowledge graph to form a whole corpus, and the whole corpus is inputted into the heterogeneous skipping word neural network model.

In the embodiment, the real-time knowledge graph and the historical knowledge graph are learned through the heterogeneous skip-gram neural network model, and then the node vector set and the historical node vector set are outputted. The heterogeneous skip-gram neural network model can represent the node vector as low-dimensional dense vector, and can describe the complex network topology and detailed semantic information of the real-time knowledge graph and the historical knowledge graph more comprehensively.

Referring to FIG. 7, in an embodiment of the present application, step S402 includes:

S701: construct a second corpus of the heterogeneous skip-gram neural network model according to the historical knowledge graph simultaneously;

The corpus of the heterogeneous skip-gram neural network model is composed of the first corpus and the second corpus together, and the first corpus and the second corpus need to be inputted to the heterogeneous skip-gram neural network model simultaneously.

S702: input the second corpus to the heterogeneous skip-gram neural network model to obtain the historical node vector set.

After the second corpus is inputted into the heterogeneous skip word neural network model, the heterogeneous skip-gram neural network model outputs the historical node vector set after learning. Consistent with the acquisition method of the first corpus, the second corpus is the path set of the historical knowledge graph. When acquiring the second corpus, any node in the historical knowledge graph is used as a starting point for path wandering. The way of path wandering is the same as the way of path wandering from step S601 to step S602, except that the real-time knowledge graph is replaced with the historical knowledge graph for path wandering. The second corpus can be obtained after acquiring the result of the path wandering.

In an embodiment of the present application, the 4-dimensional trajectory regulatory decision-making method for air traffic further includes:

constructing the real-time knowledge graph based on the real-time structured data of the real-time knowledge graph, where the real-time knowledge graph includes multiple nodes and sides connected between any two nodes; each node represents each piece of flight information, each piece of air route information, and each piece of air traffic control unit information related to the aircraft corresponding to the target flight during flight, and the sides are used to represent the relationship between the flight information, the air route information, and the air traffic control unit information.

Similarly, the historical knowledge graph may be constructed based on the real-time structured data of all flights in the historical knowledge graph at all historical moments, the historical knowledge graph includes multiple nodes and sides connected between any two nodes; each node represents each piece of flight information, each piece of air route information, and each piece of air traffic control unit information related to the historical aircraft during flight, and the sides are used to represent the relationship between the flight information, the air route information and the air traffic control unit information.

Referring to FIG. 8, in the real-time knowledge graph, the flight, the airspace management department, the air traffic flow management unit, the air traffic control unit, the airport operation unit and other control units, as well as the air route of the aircraft included in the flight, are the nodes of the real-time knowledge graph. The sides of the knowledge graph are used to represent the relationship between the flight, the airspace management department, the air traffic flow management unit, the air traffic control unit, the airport operation unit and other control units and the air route of the aircraft included in the flight. The sides of the real-time knowledge graph will change as the relationship changes. For example, if the air route point of the target flight during operation is transferred from the current air route point to the next air route point, the side used to connect the target flight node and the current air route point node is deleted, and a side that connects the target flight node and the next air route point node is established. The real-time knowledge graph can be defined as G=(V,E,T) ($\phi$:V→$T_V$, $\psi$:E→$T_E$), where V represents a set of multiple types of nodes, and E represents a set of multiple types of sides, T represents a set of object types, and the object types refer to nodes and sides. For example, different types of nodes include flights, control units, air routes, weather conditions, and so on. Different types of sides include for example regulatory relations, environmental relations, etc. ($\phi$:V→$T_V$) represents the relationship between each node and the set of node types, ($\psi$:E→$T_E$) represents the relationship between each side and the set of side types.

In an embodiment of the present application, the similarity is the cosine similarity, and step S203 includes:

determining the similarity data based on the equation $$s(a, b) = \cos\theta = \frac{X_a \cdot X_b}{|X_a| \cdot |X_b|},$$

where $X_a$ represents the target node vector set; $X_b$ represents the historical node vector set.

After representing and learning the graph data structure of the real-time knowledge graph and the graph data structure of the historical knowledge graph, a subgraph centered on a single flight is selected from the real-time knowledge graph. Each subgraph is composed of some fixed nodes, and a subgraph a may be expressed as a sum of embedded representations of all the nodes included in the subgraph, namely $$X_a = \Sigma_{i=1}^{n} X_i \quad (2)$$

where the $X_i$ represents the vector representation of a node included in the subgraph, and n represents that the subgraph includes a total of n nodes.

Then, the similarity is calculated between a subgraph a of the current flight and a subgraph b of any flight in the historical knowledge graph, and the matching subgraph is found to obtain the control instruction in the similar historical scene to assist in decision-making. Specifically, the cosine similarity may be used to measure the similarity between the current subgraph a and the subgraph b formed by a certain historical flight, as shown in equation (3):

$$s(a, b) = \cos\theta = \frac{X_a \cdot X_b}{|X_a| \cdot |X_b|} \quad (3)$$

where $X_a$, $X_b$ represent the embedded vector representations of subgraph a of the current flight, and subgraph b of a flight in an "expert graph", respectively. Obviously, the closer the cosine value is to 1, the closer the intersection angle is to 0, indicating that the similarity between the scenes of the two flights is higher. Finally, the 4-dimensional trajectory regulatory decision-making is implemented by outputting a control instruction in the similar scene.

Figure 9:
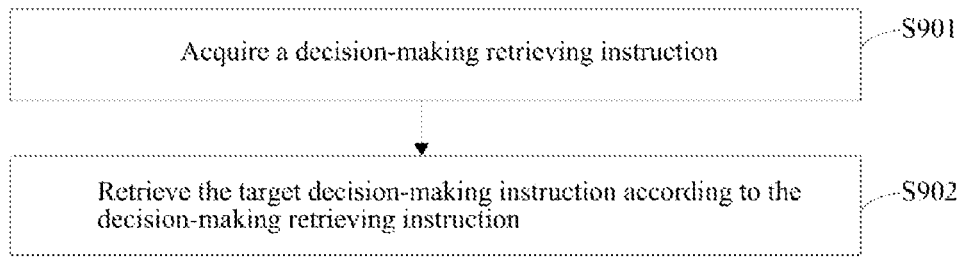
FIG. 9 is a schematic flowchart of a 4-dimensional trajectory regulatory decision-making method for air traffic provided by another embodiment of the present application.

Referring to FIG. 9, in an embodiment of the present application, after step S206, the 4-dimensional trajectory regulatory decision-making method for air traffic further includes:

S901: acquire a decision-making retrieving instruction;

The decision-making retrieving instruction is used to retrieve the target decision-making instruction. The target flight is selected by the staff. Specifically, the staff may input the decision-making retrieving instruction based on the computer device, the decision-making retrieving instruction may be, for example, information of a certain flight.

S902: retrieve the target decision-making instruction according to the decision-making retrieving instruction.

After the computer device obtains the decision-making retrieving instruction, it can retrieve the target decision-making instruction according to the decision-making retrieving instruction. For example, an unexpected situation occurs during operation of a certain flight, such as thunder and lightning weather, etc. The real-time knowledge graph corresponding to the certain flight may also change. After the historical knowledge graph similar to the real-time knowledge graph of the certain flight is determined, a historical scene similar to the scene which the certain flight is in can be obtained. After acquiring the decision-making instruction of the historical scene as the target decision-making instruction, the decision can be made to the current scene, which the certain flight is in, based on the target decision-making instruction. After the air traffic controller obtains the target decision-making instruction through the computer device, the air traffic controller can perform regulation to the certain flight based on the target decision-making instruction. In an optional embodiment, the computer device may display the target decision-making instruction after acquiring the decision-making retrieving instruction.

It should be noted that in this article, the terms "include", "comprise" or any other variants thereof are intended for non-exclusive inclusion, so that the process, method, article or device including a series of elements not only include those elements, but also include other elements that are not explicitly listed, or the elements inherent to the process, method, article, or device. Under the condition with no more restrictions, the element defined by the sentence "including a . . . " does not exclude other same elements existing in the process, method, article, or device which include the defined element.

The serial numbers of the embodiments of the present application are only for description, and do not represent the advantages or disadvantages of the embodiments.

Based on the description of the above embodiments, the skilled in the art can clearly understand that the method of the above embodiments can be implemented by means of software plus a necessary general hardware platform. Certainly, it can also be implemented by hardware. But in many cases the former is better. Based on this understanding, the essence of the present application's technical solution or the part that contributes to the prior art may be embodied in the form of a software product, and the computer software product may be stored in a storage medium (such as ROM/RAM, magnetic disk, optical disc), which includes several instructions to enable a terminal device (which can be a mobile phone, a computer, a server, or a network device, etc.) to execute the methods described in the various embodiments of the present application.

The present application is described with reference to the flowchart and/or block diagram of the method, device (system), and computer program product according to the embodiment of the present application. It should be understood that each flow and/or block in the flowchart and/or block diagram, and the combination of flows and/or blocks in the flowchart and/or block diagram may be implemented by computer program instructions. These computer program instructions may be provided to a general-purpose computer, a special-purpose computer, an embedded processor, or the processor of other programmable data processing device to produce a machine, so that an apparatus for implementing functions specified in one flow or multiple flows in the flowchart and/or one block or multiple blocks in the block diagram may be produced with the instructions executed by the computer or the processor of other programmable data processing device.

These computer program instructions may also be stored in a computer-readable memory that can direct a computer or other programmable data processing device to work in a specific manner, so that the instructions stored in the computer-readable memory produce a product including an instruction device, and the instruction device may realize the functions specified in one flow or multiple flows in the flowchart and/or one block or multiple blocks in the block diagram.

These computer program instructions may also be loaded on a computer or other programmable data processing device, so that a series of operation steps may be executed on the computer or other programmable device to produce processes implemented by a computer, thereby the instruction executing on the computer or other programmable device provide steps to realize the functions specified in one flow or multiple flows in the flowchart and/or one block or multiple blocks in the block diagram.

The above are only the preferred embodiments of the present application, and do not limit the patent scope of the present application. Any equivalent structure or equivalent process transformation based on the content of the specification and drawings of the present application, or directly or indirectly used in other related technical fields, are all included in the scope of patent protection of the present application.

What is claimed is:

1. A 4-dimensional trajectory regulatory decision-making method for air traffic, comprising:
acquiring a node vector set of a target flight to obtain a target node vector set; wherein the target node vector set is determined according to a real-time knowledge graph, and the real-time knowledge graph is used to represent a relationship between flight information, air route information and air traffic control unit information related to an aircraft corresponding to the target flight during flight;

acquiring the node vector set of all historical flights simultaneously to obtain a historical node vector set; wherein the historical node vector set is determined according to a historical knowledge graph, and the historical knowledge graph is used to represent a relationship between historical flight information, historical air route information and historical air traffic control unit information related to aircraft corresponding to the historical flights during flight;

acquiring a similarity between the target node vector set and the node vector set of each historical flight in the historical node vector set to obtain a plurality of similarity data;

acquiring a similarity data which is greater than a preset data, from the plurality of similarity data to obtain a target similarity data;

acquiring a historical flight to which the target similarity data belongs to obtain a target historical flight;

acquiring a historical decision-making instruction of the target historical flight to obtain a target decision-making instruction, wherein the target decision-making instruction is used to assist in regulatory decision-making for the target flight.

2. The method according to claim 1, wherein the acquiring the node vector set of the target flight to obtain the target node vector set comprises:

acquiring a real-time structured data of the real-time knowledge graph of the target flight;

inputting the real-time structured data into a heterogeneous skip-gram neural network model to obtain the target node vector set.

3. The method according to claim 2, wherein the acquiring the node vector set of all the historical flights simultaneously to obtain the historical node vector set comprises:

acquiring a historical structured data of the historical knowledge graph of the historical flights simultaneously;

inputting the historical structured data into the heterogeneous skip-gram neural network model to obtain the node vector set of all the historical flights;

wherein the real-time structured data and the historical structured data are inputted into the heterogeneous skip-gram neural network model simultaneously.

4. The method according to claim 3, wherein the inputting the real-time structured data into the heterogeneous skip-gram neural network model to obtain the target node vector set comprises:

constructing a corpus of the heterogeneous skip-gram neural network model according to the real-time knowledge graph to obtain a first corpus;

inputting the first corpus into the heterogeneous skip-gram neural network model to obtain the target node vector set.

5. The method according to claim 4, wherein the inputting the historical structured data into the heterogeneous skip-gram neural network model to obtain the node vector set of all the historical flights comprises:

constructing a second corpus of the heterogeneous skip-gram neural network model according to the historical knowledge graph simultaneously;

inputting the second corpus to the heterogeneous skip-gram neural network model to obtain the historical node vector set;

wherein the first corpus and the second corpus are inputted into the heterogeneous skip-gram neural network model simultaneously.

6. The method according to claim 5, wherein the first corpus is a path set of the real-time knowledge graph, and the constructing the corpus of the heterogeneous skip-gram neural network model according to the real-time knowledge graph to obtain the first corpus comprises:

taking any node in the real-time knowledge graph as a starting point to perform path wandering;

acquiring a result of the path wandering of the real-time knowledge graph to obtain the first corpus.

7. The method according to claim 6, wherein the second corpus is a path set of the historical knowledge graph, and the constructing the second corpus of the heterogeneous skip-gram neural network model according to the historical knowledge graph comprises:

taking any node in the historical knowledge graph as a starting point to perform path wandering simultaneously;

acquiring a result of the path wandering of the historical knowledge graph to obtain the second corpus.

8. The method according to claim 2, wherein the method further comprises:

constructing the real-time knowledge graph according to the real-time structured data of the real-time knowledge graph, wherein the real-time knowledge graph includes a plurality of nodes and sides connecting any two nodes; each of the nodes represents each piece of flight information, each piece of air route information, and each piece of air traffic control unit information related to the aircraft corresponding to the target flight during flight, and the sides are used to represent the relationship between the flight information, the air route information and the air traffic control unit information.

9. The method according to claim 1, wherein the similarity is cosine similarity, and the acquiring the similarity between the target node vector set and the node vector set of each historical flight in the historical node vector set to obtain the plurality of similarity data comprises;

determining the similarity data based on the equation $$s(a, b) = \cos\theta = \frac{X_a \cdot X_b}{|X_a| \cdot |X_b|},$$

wherein $X_a$ represents the target node vector set; $X_b$ represents the historical node vector set.

10. The method according to claim 1, wherein after obtaining the target decision-making instruction, the method further comprises:

acquiring a decision-making retrieving instruction;

retrieving the target decision-making instruction according to the decision-making retrieving instruction.

* * * * *